2,952,546

HOP FLAVORING MATERIAL AND METHOD OF PREPARING SAME

Aladar Fonyo, Chicago, Ill., assignor to Wm. J. Stange Co., Chicago, Ill., a corporation of Illinois No Drawing. Filed Dec. 12, 1957, Ser. No. 702,245

6 Claims. (Cl. 99—50.5)

This invention relates to a stable hop flavoring material and to a method of flavoring beer with the said hop material.

Hops as used in a brewery are the catkins or strobiles of the hop plant. Hops contain certain soft resins ("alpha" and "beta" resins) which impart bitterness to the beer and hops also contain a volatile hop oil which furnishes aroma. In the brewing process, the wort is boiled with hops for a length of time dependent upon the amount of bitter taste desired in the beer. During this boiling process the aroma (the volatile hop oil) is practically all lost, so that the resulting beer possesses only the bitter taste of the hops. For this reason, a hop aroma is sometimes imparted to beer by a dry hopping step. This is an extraction or dissolution of the volatile oil from hops. For this purpose, dry hops are introduced into the finished beer, as in conditioning tanks or casks, and the hops are subsequently filtered off.

While a certain bitter taste is characteristic of beer, brewers have found that the consumer objects to a harsh or to an excessively bitter taste in beer. To meet the consumer's demand for a mildly bitter beer, brewers have used lesser amounts of hops in the preparation of beer. However, this practice leads to a reduction in the beer content of the fine, aromatic hop substances as the content of bitter substances is lowered. The resulting beer lacks the desirable rich hop aroma. In other words, conventional hopping of beer necessarily brings about a more or less fixed ratio, in the beer, of bitter hop substances to aromatic hop substances, which ratio can not be varied as desired.

It is therefore an important object of the present invention to provide a hop flavoring composition and a method of hopping beer whereby the brewer can prepare beer of rich aromatic hop flavor but without excessively bitter taste.

The difficulties of the brewer in preparing an aromatic beer free from excessive bitterness are enhanced by the instability of the flavoring substances present in hops. Hops, of course, are harvested seasonally and fresh hops (which have not been dried or dehydrated or stored for any length of time) contain all the flavoring substances in unimpaired condition. But when, as is customary, hops are dried for storage, the aromatic oil present in the fresh, undried hops is lost in part and impaired in quality. The bitter resin contents begin to deteriorate when hops are dried. Even freezing of the hops and cold storage of the frozen hops does not completely prevent deterioration of the flavoring substances in hops, apart from the fact that the technical difficulties in preserving hops by freezing are so great as to render such preservation impractical.

Attempts have been made to extract the flavor content of hops, but without success, for the extracted flavor is impaired when the solvent is removed.

Nor is it practically possible to treat whole hops with an antioxidant to protect the flavor content of the hops against deterioration.

Further, hop aroma present in beer is not stable, being subject to oxidative deterioration that may take place in any stage of the brewing operations such as when the wort is aerated or the beer pasteurized. I have many times noticed that pasteurized beer loses its hop aroma upon storage.

It is therefore another important object of the present invention to provide a stable hop flavoring composition and a method of stabilizing the aroma of beer.

My flavoring composition comprises lupulin. This substance is derived from the bracts of the hops. Each lupulin particle consists of a closed cup-like fibrous container filled with hop flavoring substances including soft bitter resins and volatile aromatic oil. Actually 80 percent or more of the flavor content of the hop plant is to be found in the lupulin.

Lupulin, as such, has heretofore not been principally depended upon for hopping beer. Lupulin, when shaken loose upon handling of hops, has been collected and used along with hops, simply so as not to waste the flavor present in the lupulin. This flavor content of the lupulin deteriorates, as disclosed hereinabove, when the hops are dried.

Attempts have been made to extract the flavor content of lupulin, but such attempts have not been successful, for the flavor is impaired when the solvent is removed.

The flavoring material of the present invention is prepared from the lupulin of fresh hops. The lupulin is collected and, if not used immediately for the preparation of my flavoring composition is frozen, say at $-10°$ F. or $-20°$ F., and preserved in frozen condition until used for the purpose indicated, or fresh hops may be frozen at about $-10°$ F. to $-20°$ F. and the lupulin, which is brittle at these low temperatures, shaken loose and separated from the hops.

In preparing my flavoring composition from lupulin derived from fresh hops, I break up the lupulin particles and disperse or dissolve at least part of the flavoring substances in a suitable menstruum which is also a solvent for a food grade antioxidant. Such a menstruum must, of course, be edible. Among the menstrua suitable for this purpose are the monohydric and polyhydric alcohols, for instance, ethyl alcohol and glycerine. The latter is a preferred menstruum. Suitably from about two or three parts by weight of glycerine or the like may be used for each part of lupulin. The dispersion of the flavoring substances and the preceding breaking up of the lupulin particles is suitably carried out as a single process in a colloidal mill, which breaks up the fibrous containers of the lupulin and disperses at least part of the resinous and oily hop flavoring substances thus liberated from the lupulin particles.

To the resulting lupulin dispersion I add an appropriate amount of a food grade antioxidant. For instance, I can add 0.05 or 0.1% nordihydroguaiaretic acid. Other antioxidants can also be used such as equivalent amounts of propyl gallate or butylated hydroxy anisole. These antioxidants are actually dispersed or dissolved in the hop resins and oils contained in the lupulin dispersion.

Any conventional edible antioxidant soluble in hop resins and/or aromatic hop oil derived from lupulin may be used. The exact amount of antioxidant to be used will vary somewhat depending on the specific antioxidant used, variations in the brewing process, amounts of hops incorporated with the beer apart from the lupulin added in the form of my novel flavoring composition, and other like factors.

My novel hop flavoring composition is stable. The essential oil and resin contents thereof both keep their flavoring potencies on prolonged storage. For this purpose as little as .05% nordihydroguaiaretic acid (or an equivalent amount of some other antioxidant such as propyl gallate or butylated hydroxy anisole) is sufficient but greater amounts of nordihydroguaiaretic acid such as 0.1% (or equivalent amounts of other antioxidants) also protect the hop resins and other substances subject to oxidative deterioration present in beer to which my flavoring composition has been added. These greater amounts of antioxidants in my flavoring composition are capable of protecting hop substances (including both hop resins and hop aromatic oils) introduced into the beer by the customary process of boiling hops in the wort before fermentation. These greater amounts of antioxidants in my flavoring composition also protect other beer ingredients subject to oxidative deterioration that may take place in any stage of the brewing process or thereafter such as when the wort is aerated or the beer pasteurized.

In the brewing of beer my flavoring composition is added subsequently to the hopping and boiling of the wort. While my composition is preferably added immediately after the hopping and boiling of the wort, the addition may be carried out as late as in the beer storage cellar.

My flavoring composition makes possible the brewing of beer having a greatly enhanced aroma, as is explained hereinbelow.

My hop flavoring composition provides the brewer with a novel brewing material by the use of which the bitter-tasting substances of the beer may be reduced without sacrificing the desired hop aroma. This is quite evident since in the preparation of my hop flavoring composition I use the fresh lupulin that contains the total essential oil of hops without such loss and impairment as occurs during the customary drying process. Further, the aroma is retained and unimpaired during pasteurization and storage of beer due to the antioxidant being dissolved in the aromatic and resinous components of my flavoring composition. Beer that does not contain the antioxidant dissolved in the hop aromatic oils and resins readily loses its already deficient hop aroma in storage.

By way of a specific example of the preparation of a flavoring composition according to the present invention, I have frozen hops at −15° F., shaken the lupulin loose and separated the hops by sifting. One part of lupulin has then emulsified or suspended in two and one-half parts of glycerin, using a colloidal mill. To the resulting emulsion or suspension I added 0.1% of nordihydroguaiaretic acid. I have also prepared similar compositions substituting butylated hydroxy anisole, propyl gallate, and mixtures thereof, for the above disclosed nordihydroguaiaretic acid.

The practical application of my hop flavoring composition in the brewing of beer may be illustrated with the following two examples:

In one test brew which customarily was prepared by boiling 50 lbs. of hops in wort to produce 100 barrels (31 gallons each) of beer, I substituted 3 lbs. of hops with 15 ozs. of my hop composition. That is, I boiled 35 lbs. of hops in the wort and after the boiling process was completed I added to the hot wort 15 ozs. of my hop composition at a stage prior to the cooling of the hot wort. No other change in the brewing process was made. The resulting beer had a less bitter taste and a better hop aroma than the control batch prepared in the usual manner.

It is apparent that the objective of the above test was to prove that the bitter taste of the beer can be reduced without sacrificing the richness of the hop aroma.

The second test brew was conducted with the objective of improving a beer in which the bitter taste was already reduced to a desired point but which lacked the desired aroma. In a brew which was customarily prepared with 33 lbs. of hops to 100 barrels of beer, I used 5 lbs. less hops—that is, 28 lbs. per 100 barrels, and added 12 ozs. of my flavoring composition after the boiling process was completed. The procedure was the same as in the first test brew. The beer so produced had a greatly improved aroma and taste.

It is understood that the proportion of hops and amounts of my hop flavoring composition used in the above test brews should serve merely as examples and without limitations to make such other modifications that may be desired from time to time.

The invention is claimed as follows:

1. A flavoring composition comprising: an edible solvent, an antioxidant dispersed in said solvent, and disintegrated lupulin, including all of the natural volatile essential oils and dissociated from the remainder of the hops from which said lupulin is derived, said lupulin being dispersed in said solvent and protected by said antioxidant.

2. A flavoring composition according to claim 1 in which said solvent is a water-soluble alcohol.

3. A composition according to claim 1 in which said antioxidant is nordihydroguaiaretic acid in an amount sufficient to prevent oxidative deterioration of said lupulin.

4. A flavoring composition comprising: two to three parts by weight of glycerin, one part by weight of disintegrated lupulin, including all of the natural volatile essential oils and dissociated from the remainder of the hops from which said lupulin is derived, said lupulin being substantially dispersed in said glycerin to form a dispersion, and an antioxidant dissolved in said dispersion, said antioxidant consisting of nordihydroguaiaretic acid in an amount sufficient to prevent oxidative deterioration of said lupulin.

5. The method of preparing a flavoring composition which comprises separating lupulin from the hops from which said lupulin is derived, and disintegrating and dispersing said lupulin in an edible solvent containing an edible antioxidant.

6. In the process of brewing beer which includes boiling of the wort, the improvement which consists in adding to said beer subsequent to the boiling of the wort a flavoring composition comprising an edible solvent, an antioxidant dispersed in said solvent and disintegrated lupulin dissociated from the remainder of the hops from which said lupulin is derived, said lupulin being dispersed in said solvent and being protected by said antioxidant.

References Cited in the file of this patent

UNITED STATES PATENTS

| | | |
|---|---|---|
| 2,708,164 | Wahl | May 10, 1955 |
| 2,824,803 | Stark | Feb. 25, 1958 |
| 2,833,652 | Naatz | May 6, 1958 |